UNITED STATES PATENT OFFICE.

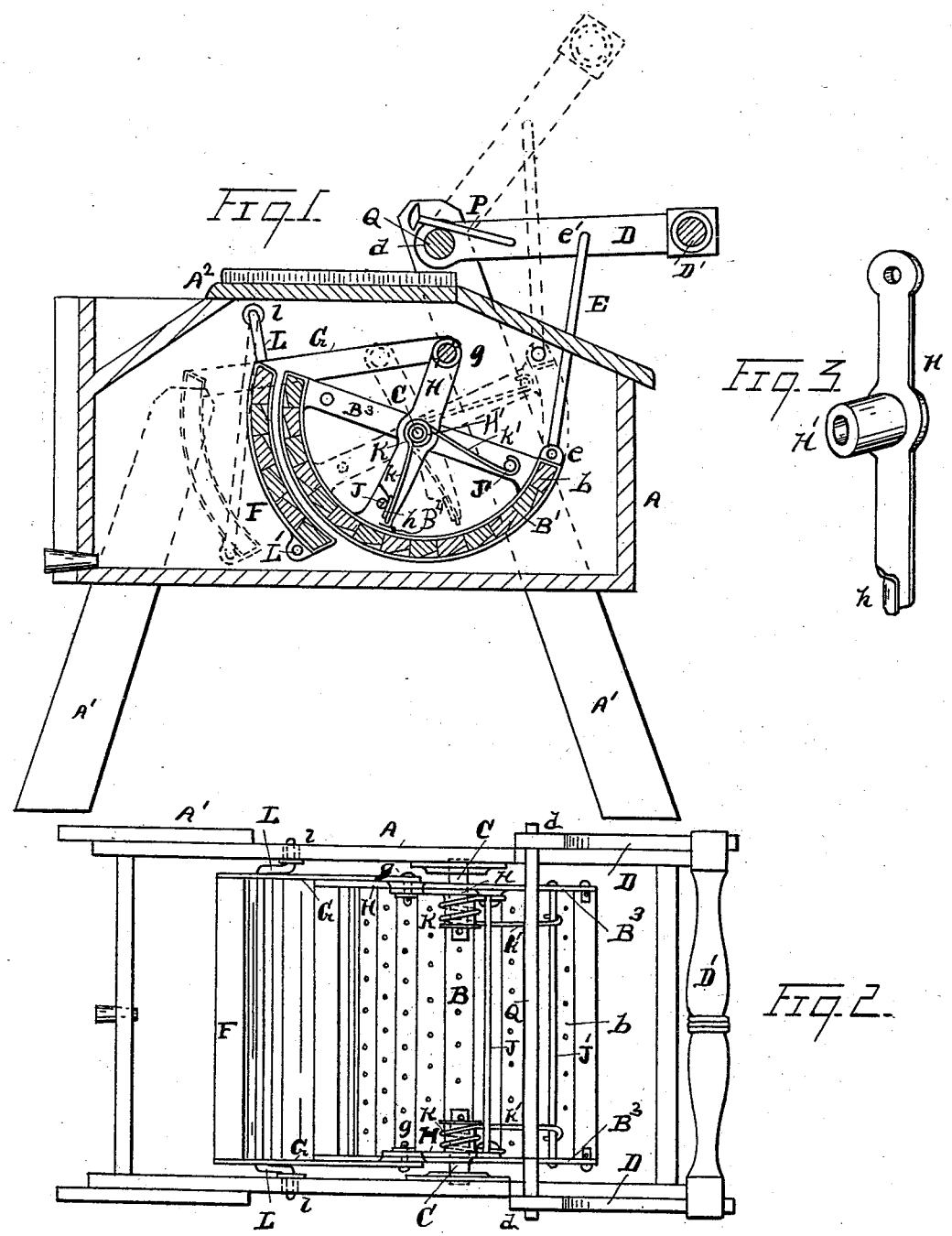

PHILIP VOLLMAR, OF CHATHAM, CANADA.

WASHING-MACHINE.

SPECIFICATION forming part of Letters Patent No. 492,616, dated February 28, 1893.

Application filed October 24, 1892. Serial No. 449,794. (No model.) Patented in Canada October 25, 1890, No. 35,287.

*To all whom it may concern:*

Be it known that I, PHILIP VOLLMAR, a subject of the Queen of Great Britain, residing at Chatham, county of Kent, Province of Ontario, Canada, have invented a certain new and useful Improvement in Washing-Machines, (patented in the Dominion of Canada October 25, 1890, No. 35,287;) and I declare the following to be a full, clear, and exact description of the invention, such as will enable others skilled in the art to which it appertains to make and use the same, reference being had to the accompanying drawings, which form a part of this specification.

My invention relates to certain new and useful improvements in a washing machine, and has for its objects a novel device of this character, of simple and economical construction, one which may be easily operated and which shall be of superior efficiency.

My invention contemplates the employment of an oscillating rubber and a movable bumper, so constructed and arranged that the rubber will clean the clothes by squeezing them and forcing the suds through and out of them, the rubber then retracting to permit the suds to penetrate the clothing again, the operation being continued until the clothes are thoroughly cleansed.

My invention is further designed to provide mechanism as above outlined, which may be operated without wearing and damaging the clothing.

To these ends my invention consists of the devices and appliances, their construction, combination and arrangement, as hereinafter specified and claimed, and illustrated in the accompanying drawings, in which—

Figure 1 is a vertical longitudinal section. Fig. 2 is a plan view. Fig. 3 is a view in detail of the arm H.

I carry out my invention as follows:

A represents any suitable tub supported upon legs A'. $A^2$ is a cover therefor.

B denotes an arc-shaped oscillating rubber constructed in any suitable manner, as with metal heads or sides B', with which are engaged suitable ribs "b."

$B^3$ denotes cross braces or arms joining the upper edges of the rubber at the end thereof and secured intermediate its ends upon pivots C.

$B^4$ denotes additional arms engaged at one end with the rubber and at the opposite end upon said pivots C. Said pivots being engaged upon the side of the tub. This construction will obviously allow the rubber to have an oscillatory movement in the tub.

D represents levers, one end of each being pivotally connected with one of the legs of the washer, as shown at "d." With the opposite ends of said levers is engaged an operating handle D'.

E represents connecting rods having a pivotal connection with the rubber at one end and with said levers at the opposite ends, as shown at "e" and "e'." By means of the handle, thus, an oscillatory motion is given to the rubber.

F denotes a segmental bumper or rubber which may, in itself, be constructed in a manner similar to that of the rubber B, although I do not limit myself to any specific construction thereof.

G denotes arms having a rigid engagement with said bumper at one end, the opposite ends of said arms being connected with the rubber B by the intervention of oscillatory arms H, having a jointed engagement therewith, as shown at "g." The arms H are engaged, toward their lower ends upon the pivots C, the said arms being provided with hubs H' engaging the pivots. The lower ends of the arms extend below said pivots and are formed with a lateral flange "h."

J represents a rod extending across the rubber and uniting cross braces $B^3$ thereof. The flange "h" of the arms H are located against said rods J and are retained thereagainst by means of a coiled spring K, until the tension of the spring is overcome. The spring K is constructed with arms "k," "k'," engaged intermediate their ends upon the pivots C. The arm "k" impinges against the rod J. The opposite arm of the spring engages upon a cross rod J', uniting the cross braces $B^3$. The bumper F is supported by rods L, having their lower ends jointedly engaged with said bumper as at L' their upper ends working in suitable bushings at "l," near the top of the tub. As so constructed it will be observed that when the handle is thrown downward, the bumper F is drawn toward the rubber to squeeze the clothes therebetween. The lower ends of the arms H being retained against the rod J, until the tension of the spring is overcome, as above observed, it will be seen that when said tension is overcome, the rubber B may continue its travel without drawing the bumper nearer to said rubber. This further travel gives to the fabrics therebetween a rotatable movement, and changes their position. An opposite movement of the handle throws the bumper away from the rubber, as shown in dotted lines Fig. 1, whereby the suds are again allowed to impregnate the clothes. The bumper is held in an open position for inserting the clothes into the machine between the rubber and bumper by means of a handle P, pivoted at one end in one of the levers D, which may be thrown over to rest upon a cross rod Q uniting the adjacent legs A'.

What I claim as my invention is—

1. The combination with a tub, of an oscillatory rubber, a movable bumper, oscillatory arms connecting said bumper with said rubber, and springs exerting their tension upon said arms, substantially as and in the manner described.

2. In combination, a tub, an oscillatory rubber B, a bumper F, oscillatory arms having a jointed connection with said bumper and with said rubber, and a spring exerting its tension upon said rubber and arms, whereby when the tension of the spring is overcome, the rubber may oscillate independent of the bumper, substantially as described.

In testimony whereof I sign this specification in the presence of two witnesses.

PHILIP VOLLMAR.

Witnesses:
N. S. WRIGHT,
JOHN F. MILLER.